W. F. HEADLAND.
POTATO DIGGER.
APPLICATION FILED MAR. 11, 1910.
969,690.
Patented Sept. 6, 1910.
2 SHEETS—SHEET 2.
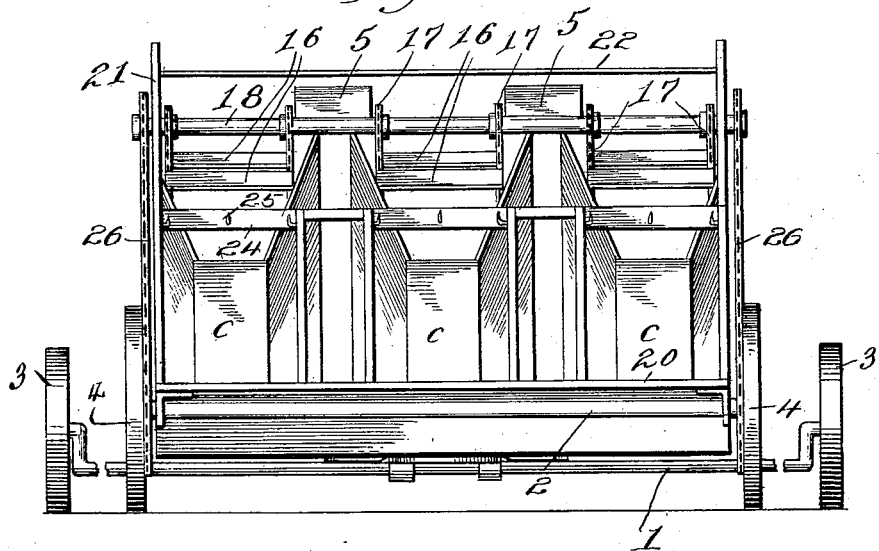
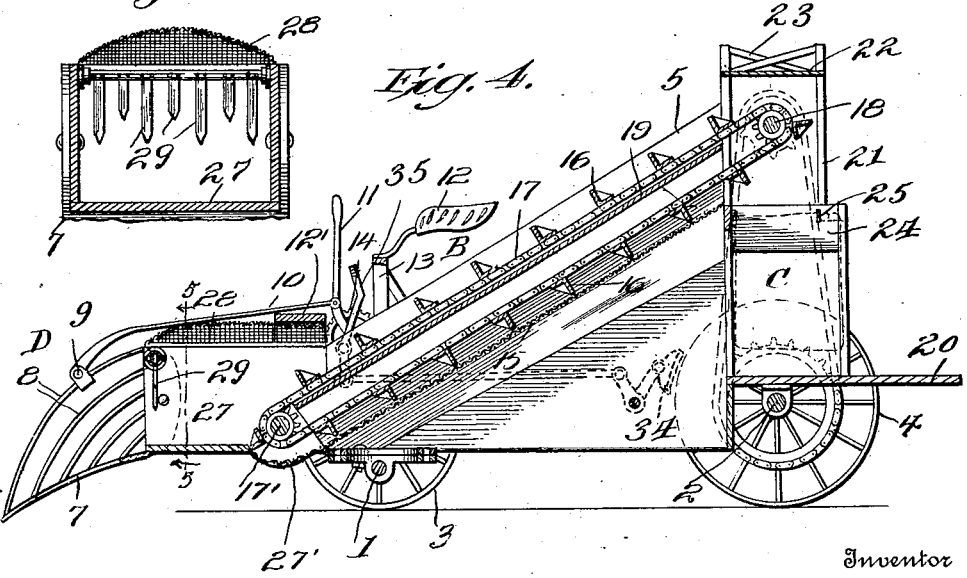
Inventor
Walter F. Headland
Witnesses
By Victor J. Evans,
Attorney

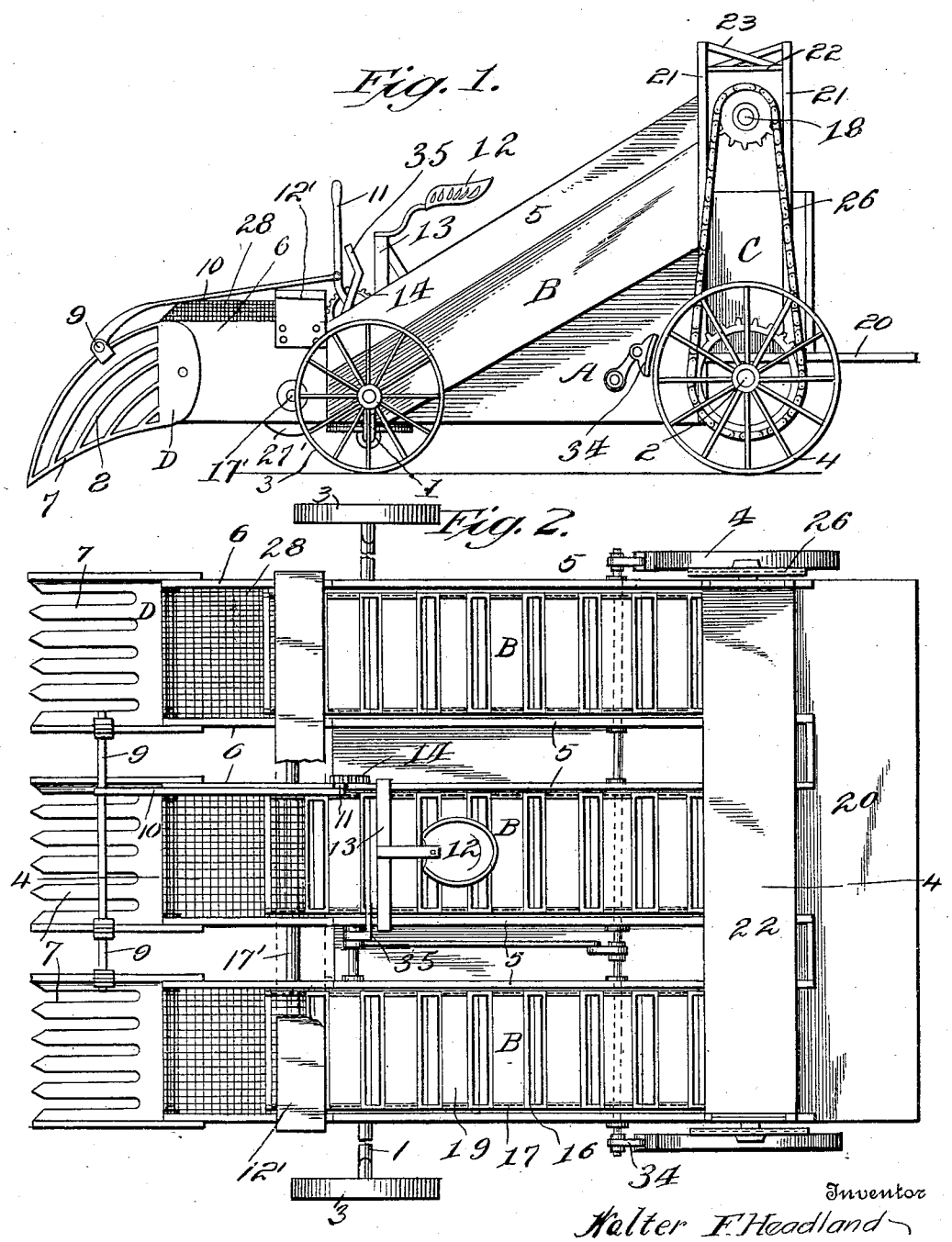

UNITED STATES PATENT OFFICE.

WALTER F. HEADLAND, OF ST. JOHNS, OREGON.

POTATO-DIGGER.

969,690.  Specification of Letters Patent.  Patented Sept. 6, 1910.

Application filed March 11, 1910. Serial No. 548,562.

*To all whom it may concern:*

Be it known that I, WALTER F. HEADLAND, a citizen of the United States of America, residing at St. Johns, in the county of Multnomah and State of Oregon, have invented new and useful Improvements in Potato-Diggers, of which the following is a specification.

This invention relates to potato diggers, and one of the objects of said invention is to construct an organized machine capable of operating upon one or more rows, whereby the potatoes may be dug from the ground, elevated, separated from the vines and conveyed over a sifting screen to a discharge point where they may be deposited in suitably supported sacks or bags, which latter when filled may be tied and thrown upon the ground to be afterward picked up by a gathering vehicle.

A further object of the invention is to simplify and improve the construction and operation of the digging and elevating means and of the vine separating means.

Still further objects of the invention are to simplify and improve the general construction and operation of a machine of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a side elevation of a machine constructed in accordance with the invention. Fig. 2 is a top plan view of the same. Fig. 3 is a rear elevation. Fig. 4 is a longitudinal vertical sectional view taken on the plane indicated by the line 4—4 in Fig. 2. Fig. 5 is a transverse sectional detail view taken on the plane indicated by the line 5—5 in Fig. 4.

Corresponding parts in the several views are denoted by like characters of reference.

The frame A of the improved machine is supported upon front and rear axles 1 and 2 having carrying wheels 3 and 4. The frame includes or supports a plurality of carrier casings B, B, each arranged at a suitable inclination in a forward and downward direction, and said carrier casings being suitably spaced apart, as will be clearly seen in Fig. 2 of the drawings, one casing being provided for each row of plants that is to be operated upon. Each of the carrier casings is provided with side-boards 5, 5 having forward extensions 6, 6 adjacent to their lower ends. Diggers D are pivotally connected with the forward extension 6 of the side-boards of the carrier casings, each of said diggers being provided with forwardly extending downwardly curved teeth 7 and with side-boards composed of suitably spaced bars 8. The diggers are connected in series by a cross bar 9, said cross bar being connected by a link 10 with a suitably supported hand lever 11, see Fig. 4, which is mounted in suitable proximity to the operator whose seat 12 is supported upon an upright 13. Means including a rack segment 14 are provided for the purpose of securing the hand lever 11 in position, thus enabling the diggers connected with the several carrier casings to be simultaneously lowered to a ground-engaging position at any desired depth, or raised to a non-operative position, as will be readily understood. A convenient foot board 12′ is provided. Each of the carrier casings is provided with an inclined floor consisting of a sieve or screen 15 of wire netting or other suitable material adapted to be engaged by the slats or scrapers 16 upon the lower lead of an endless carrier 17, the lower end of which is supported upon a shaft 17′ and the upper rear end of which is supported upon a shaft 18 extending transversely of the machine adjacent to the rear of the frame. The upper lead of the carrier 17 is supported upon an inclined bottom member 19. The rear end of the frame which is supported upon the hind axle 2 includes a foot board 20 and a plurality of uprights 21, the latter being suitably connected, braced and reinforced adjacent to their upper ends by means of cross bars and braces 22, 23. Receiving stalls C are provided adjacent to the rear end of each of the endless carriers, said stalls being provided with cross bars 24 having hooks 25 upon which bags may be supported for the purpose of receiving the potatoes discharged over the screen bottoms 15 of the endless carriers. The latter are driven from the hind axle of the machine by means of chains or link belts 26.

The forward extensions 6 of the sideboards 5 of each carrier casing are connected by a bottom board 27 over which the potatoes and dirt excavated by the diggers will be moved in the direction of the lower ends of the endless carriers, the rear ends of said bottom boards being connected with the lower edges of the screen bottoms 15 by means of arcuate pockets 27' of suitable dimensions to admit the carrier slats which serve to convey the potatoes and the dirt adhering thereto over the pockets 27' and screen bottom 15 to the point of discharge. The side-boards 6, 6 of each carrier casing are connected adjacent to their upper edges by a hood 28 of wire netting or other suitable material, said hood being preferably V-shaped or arched in cross section and provided adjacent to its front edge with downwardly extending vine-stripping teeth 29 which, while they will permit the potatoes and the dirt adhering thereto to pass under the hoods on to the bottom boards 27, will strip potatoes from the vines, the latter passing over the hoods from which they are discharged downwardly through the spaces between the forwardly extending lower ends of the individual carriers and adjacent to the sides of the machine. When vines accumulate in front of the stripping teeth 29, they may be discharged upwardly upon the hoods 28 by tilting the diggers upward by properly manipulating the lever 11.

A suitable brake device, shown at 34, is provided, the same being adapted to be operated by a foot lever 35.

From the foregoing description, taken in connection with the drawings hereto annexed, the operation and advantages of this invention will be readily understood. The digging and separating parts of the machine are automatic in their operation, and an operator stationed upon the foot board 20 may easily supply the bags into which the potatoes are discharged and remove the bags as they become filled. The spaces between the carriers may be utilized as tool boxes or for any other suitable purpose.

Having thus described the invention, what is claimed as new, is:—

1. In a machine of the character described, a frame, an inclined carrier casing having a screen bottom, and side members provided with forward extensions at their lower ends, a bottom member connecting said forward extensions, a pocket connecting the bottom member with the screen bottom, a digger connected pivotally with the forward extensions, and a hood connecting said forward extensions being secured adjacent to their upper edges, said hood being of arched form and provided with downwardly extending teeth adjacent to its front edge.

2. In a machine of the character described, a frame including an elevator casing having a forward extension, a screen hood covering said extension, downward extending vine-stripping teeth at the forward end of the screen hood, a digger connected pivotally with the extension, and means for actuating the digger to discharge accumulated vines on to the screen hood.

3. In a machine of the character described, a carrying frame, digging means, elevating means, a level flooring between the digging and elevating means, side flanges adjacent to said level floor portion, an arched screen hood supported upon the side flanges, and vine-stripping teeth depending adjacent to the front edge of the arched screen hood.

In testimony whereof I affix my signature in presence of two witnesses.

WALTER F. HEADLAND.

Witnesses:
GEORGE HEADLAND,
DANIEL DRUN.